United States Patent
Bowie

(10) Patent No.: US 10,403,074 B2
(45) Date of Patent: Sep. 3, 2019

(54) SYSTEMS AND METHODS FOR WIRELESSLY TRANSMITTING TOKEN DATA TO A KEY CARD READING DEVICE

(71) Applicant: MASTERCARD INTERNATIONAL INCORPORATED, Purchase, NY (US)

(72) Inventor: William Raymond Bowie, Lake Saint Louis, MO (US)

(73) Assignee: Mastercard International Incorporated, Purchase, NY (US)

(*) Notice: Subject to any disclaimer, the term of this patent is extended or adjusted under 35 U.S.C. 154(b) by 2 days.

(21) Appl. No.: 15/917,077

(22) Filed: Mar. 9, 2018

(65) Prior Publication Data

US 2018/0197361 A1 Jul. 12, 2018

Related U.S. Application Data

(63) Continuation of application No. 15/176,000, filed on Jun. 7, 2016, now Pat. No. 9,947,160.

(51) Int. Cl.
*G07C 9/00* (2006.01)
*G06K 7/08* (2006.01)
(Continued)

(52) U.S. Cl.
CPC .......... *G07C 9/00722* (2013.01); *G06K 7/08* (2013.01); *G06K 7/087* (2013.01); *G06K 19/06206* (2013.01); *G07C 9/00182* (2013.01); *G07C 9/00309* (2013.01); *G07C 9/00571* (2013.01); *G07C 9/00857* (2013.01); *G07C 9/00904* (2013.01); *H04B 5/0056* (2013.01); *G07C 2009/00198* (2013.01); *G07C 2009/00341* (2013.01); *G07C 2009/00777* (2013.01); *G07C 2009/00865* (2013.01)

(58) Field of Classification Search
USPC ...................................... 235/382.5
See application file for complete search history.

(56) References Cited

U.S. PATENT DOCUMENTS 7,114,178 B2 * 9/2006 Dent ............... G07C 9/00309
726/3
7,198,571 B2 4/2007 LeMay
(Continued)

OTHER PUBLICATIONS

PCT International Search Report and Written Opinion, Application No. PCT/US2017/035437, dated Aug. 31, 2017, 19 pgs.

*Primary Examiner* — Rafferty D Kelly
(74) *Attorney, Agent, or Firm* — Armstrong Teasdale LLP

(57) ABSTRACT

A mobile computing device for transmitting token data to a key card reading device having an activation mechanism is provided. The computing device is programmed to receive token data representing access data of a key card, generate a transmission signal representing the access data of the key card based on the token data in response to receiving the token data, and output the transmission signal to the key card reading device. The access data causes the key card reading device to activate the activation mechanism. The transmission signal causes the key card reading device to activate the activation mechanism when the mobile computing device is placed near the key card reading device and the transmission signal is authenticated by the key card reading device.

22 Claims, 6 Drawing Sheets

(51) Int. Cl.
*H04B 5/00* (2006.01)
*G06K 19/06* (2006.01)

(56) References Cited

U.S. PATENT DOCUMENTS

| | | | |
|---|---|---|---|
| 7,315,823 B2 | 1/2008 | Brondrup | |
| 8,791,790 B2 | 7/2014 | Robertson | |
| 8,793,784 B2 * | 7/2014 | Metivier | G07C 9/00103 |
| | | | 340/5.2 |
| 8,797,138 B2 | 8/2014 | Myers | |
| 2007/0176739 A1 | 8/2007 | Raheman | |
| 2013/0241694 A1 | 9/2013 | Sharma | |
| 2013/0256397 A1 | 10/2013 | Brown | |
| 2014/0246490 A1 | 9/2014 | Graylin | |
| 2015/0199863 A1 | 7/2015 | Scoggins | |

* cited by examiner

SYSTEMS AND METHODS FOR WIRELESSLY TRANSMITTING TOKEN DATA TO A KEY CARD READING DEVICE

CROSS REFERENCE TO RELATED APPLICATIONS

This application is a continuation application of U.S. patent application Ser. No. 15/176,000, filed Jun. 7, 2016, entitled "SYSTEMS AND METHODS FOR WIRELESSLY TRANSMITTING TOKEN DATA TO A KEY CARD READING DEVICE", the disclosure of which is hereby incorporated herein by reference in its entirety.

BACKGROUND

The field of the invention relates generally to systems and methods for transmitting token data to a key card reading device and, more particularly, to systems and methods for generating token data representing access data typically included within a room key card, storing the token data on a mobile device as access data, and wirelessly transmitting the token data as a transmission signal from a mobile computing device to a key card reading device to gain access to a reserved room.

Mobile communication systems continue to grow in popularity and have become an integral part of both personal and business communications. With the number of features available rapidly increasing, mobile computing devices, often in the form of smartphones, are now used for storing addresses, keeping a calendar, reading e-mails, drafting documents, purchasing goods, storing e-wallets, etc. Furthermore, some known mobile computing devices can emit wireless signals to allow the mobile device to communicate with another computing device. For example, in some cases, a mobile device can emit changing magnetic fields or near-field communication (NFC) signals to communicate with another device.

In some cases, security systems for accessing rooms, elevators, and other selectively accessible areas or devices may include electronic locking devices. These electronics locking devices are programmable to provide access to the area or device when a user provides an access code that corresponds to the locking device. For example, in a hotel, key cards are provided to guests that include magnetic stripes. These magnetic stripes store data that is associated with a particular room and a key card reading device. When the key card is placed into physical contact with a magnetic reader of the reading device, the data from the key card (access data) is collected and compared to stored data (i.e., security data) by the reading device. If the collected data and the stored data match, the guest is given access to the room by the reading device. The electronic locking devices further enable providers (e.g., hotel management) to generate a new access code without physically replacing the locking system. By generating new access codes, the providers can prevent previous users from gaining access without the permission of the providers.

In recent years, competition among lodging establishments have resulted in the need to find effective and novel ways of providing a memorable and positive experience to guests. In general, when a guest enters a lodging establishment, the guest typically wants to minimize the wait time, namely the time between when the guest enters the establishment and the time he or she can check into and enter a reserved room. Likewise, the lodging establishment typically wants to enable the guest to enter a room as quickly as possible in order to optimize the lodging experience. Any delays or hassles may result in a significantly diminished guest experience. Furthermore, the lodging establishment typically wants to provide the guest with an easy, yet secure, method of checking into the lodging establishment and entering his or her room.

Therefore, systems and methods are needed that enable a lodging guest to enter a reserved room as quickly as possible using an easily accessible mobile device, such as a smart phone.

BRIEF DESCRIPTION

In one embodiment, a mobile computing device for transmitting token data to a key card reading device having an activation mechanism is provided. The computing device includes a memory device for storing data, a processor, and a transmitter. The processor is in communication with the memory device and the transmitter. The computing device is programmed to receive token data representing access data of a key card, generate a transmission signal representing the access data of the key card based on the token data in response to receiving the token data, and output the transmission signal to the key card reading device. The access data causes the key card reading device to activate the activation mechanism. The transmission signal causes the key card reading device to activate the activation mechanism when the mobile computing device is placed near the key card reading device and the transmission signal is authenticated by the key card reading device.

In another embodiment, a method for activating an activation mechanism of a key card reading device is provided. The method is at least partially performed by a mobile computing device. The method includes receiving token data representing access data of a key card, generating a transmission signal representing the access data of the key card based on the token data in response to receiving the token data, and outputting the transmission signal to the key card reading device. The access data causes the key card reading device to activate the activation mechanism. The transmission signal causes the key card reading device to activate the activation mechanism when the mobile computing device is placed near the key card reading device and the transmission signal is authenticated by the key card reading device.

In yet another embodiment, at least one non-transitory computer-readable storage media having computer-executable instructions embodied thereon is provided. When executed by at least one processor, the computer-executable instructions cause the processor to receive token data representing access data of a key card, generate a transmission signal based on the token data in response to receiving the token data, and output the transmission signal to the key card reading device. The access data causes a key card reading device to activate an activation mechanism. The transmission signal causes the key card reading device to activate the activation mechanism when a transmitter communicatively coupled to the processor is placed near the key card reading device and the transmission signal is authenticated by the key card reading device.

In a further aspect, a hospitality system is provided. The hospitality system includes a key card reading device associated with a door and a hospitality server. The key card reading device selectively unlocks the door. The hospitality server generates token data and security data that represents access data for selectively accessing the door, transmits the security data to the key card reading device, and transmit the token data to a mobile computing device. The token data (i) causes the mobile computing device to output a transmission signal representing the token data to the key card reading device when the mobile computing device is near the key card reading device, and (ii) causes the key card reading device to authenticate the user and unlock the door.

BRIEF DESCRIPTION OF THE DRAWINGS

FIG. 1 is a simplified block diagram of an exemplary hospitality computing system for contactless transmission of wave signals representing token data from a mobile computing device to a key card reading device in accordance with one embodiment of the present invention.

FIG. 2 illustrates an exemplary configuration of a user system such as the mobile computing device shown in FIG. 1 in accordance with an exemplary embodiment of the present invention.

FIG. 3 illustrates an exemplary configuration of a server system shown in FIG. 1 in accordance with an exemplary embodiment of the present invention.

FIG. 4 illustrates an exemplary configuration of the mobile computing device and the key card reading device as shown in FIG. 1 in accordance with an exemplary embodiment of the present invention.

FIG. 5 is a schematic view of an example hospitality computing system similar to the system shown in FIG. 1 in accordance with an exemplary embodiment of the present invention.

FIG. 6 is a flow diagram of a method for transmitting token data to a key card reading device using the system shown in FIG. 1 in accordance with an exemplary embodiment of the present invention.

DETAILED DESCRIPTION

Figure 1:
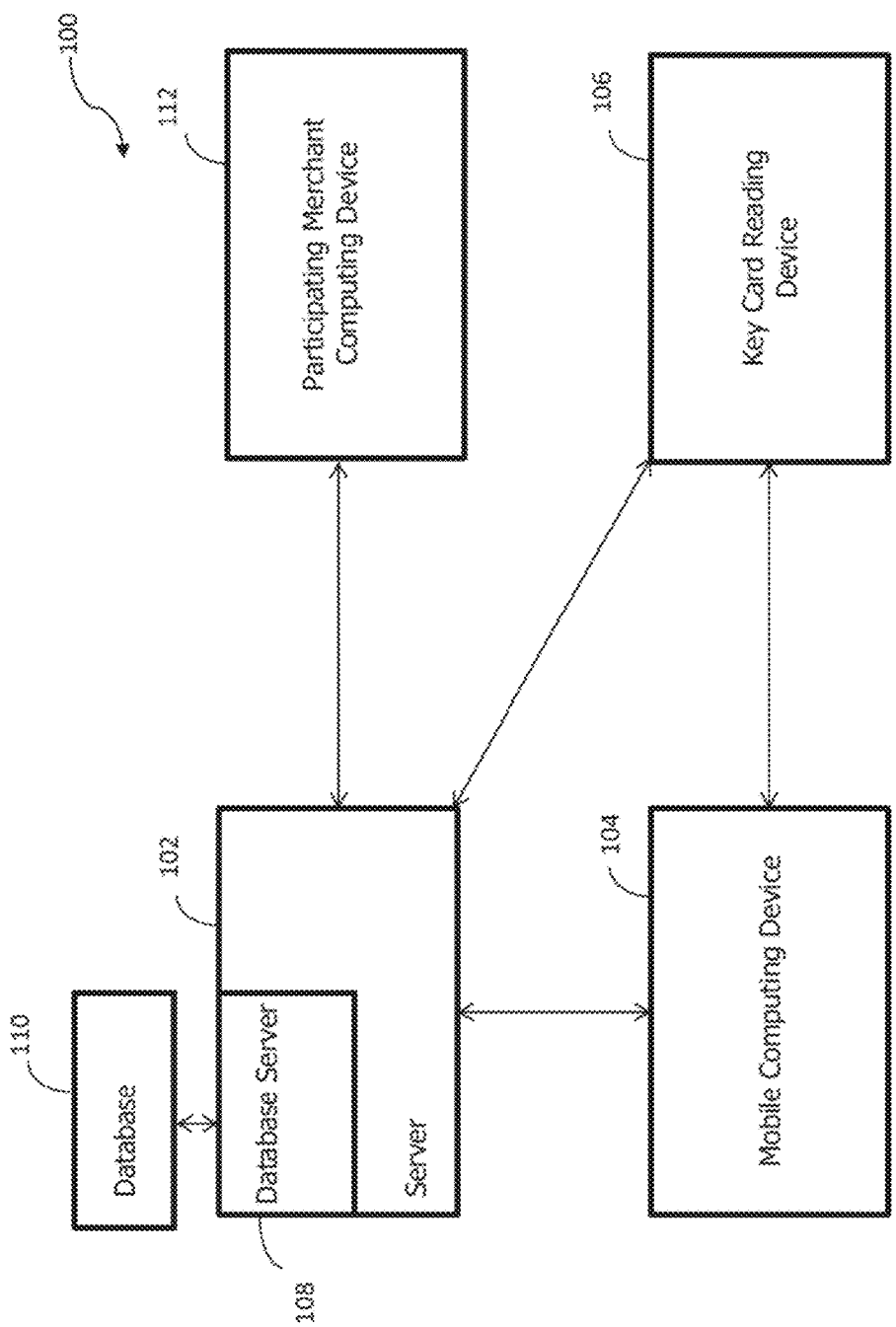
FIGS. 1-6 show exemplary embodiments of the device and method described herein.

Embodiments of the present disclosure relate generally to contactless transmission of a transmission signal from a mobile computing device to a key card reading device attached to a selectively accessible device (e.g., a door), the key card reading device enabled to activate or unlock the selectively accessible device based on the received signal. In one embodiment, the transmission signal includes changing magnetic fields that are emitted from a transmitter of the mobile computing device to a receiver included within a key card reading device. In another embodiment, the transmission signal includes radio waves, near-field communication (NFC) waves, or any other communication signals capable of being transmitted wirelessly to a receiver of a key card reading device.

The methods and systems described herein include a hospitality computing system that includes at least a mobile computing device, a key card reading device, and a hospitality server. The mobile computing device includes a processor, a memory device, and a transmitter configured to output transmission signals. In one embodiment, the mobile computing device further includes a digital wallet (i.e., MasterCard International Incorporated MasterPass® system). The hospitality server includes one or more processors, a memory, and a database. The hospitality server is configured to communicate with the mobile computing device to facilitate remote actions, such as reserving rooms, checking-in, and checking-out of the hotel establishment. The database is configured to store token data for providing selective access to rooms. The token data is representative of access data, such as magnetic stripe data of a key card. The token data is a unique identifier that is used to match a user with a selectively accessible area or device (e.g., a guest at a hotel and their reserved room). The database further stores security data that is provided to the key card reading device. The security data is paired to matching token data in the database. That is, when the hospitality server provides token data to the mobile device, security data that matches the token data is provided to the key card reading device. In some embodiments, the server may be in communication with one or more kiosks or terminals that enable the guests to perform the remote actions. These kiosks may be configured to communicate with the mobile computing device to provide the token data.

The key card reading device, which is attached to a selectively accessible device, includes a receiver card reader that includes a magnetic reader head, a processor, a memory for storing security data from the hospitality server, a transceiver for transmitting and receiving transmission signals, and a mechanism to unlock or activate the selectively accessible device. The receiver is configured to receive the transmission signal. For example, if the transmission signal includes changing magnetic fields or waves, the receiver may include a magnetic reader head to collect the transmission signal.

The selectively accessible device may be a door, an elevator, or a different device that is locked to prevent unauthorized access to the device. Although a door is used herein as an example, it is to be understood that any other selectively accessible device may be used. In the example embodiment, the door is associated with a room at a lodging establishment (i.e., a hotel, a motel, a non-transient apartment, a transient apartment, a bed and breakfast inn, a timeshare project, or a vacation rental). The mobile computing device, such as a smart phone, transmits transmission signals representing access data to the key card reading device based upon token data received from the hospitality server. The key card reading device converts the transmission signals to the token data and authenticates the token data by comparing the token data to security data stored by the key card reading device. If authentication is successful (i.e., the token data and security data match), the key card reading device unlocks the door to provide access to the room.

In some embodiments, the token data is representative of magstripe (also referred to as "magnetic stripe") data stored within a magnetic stripe coupled to, for example, a magnetically-encoded key card used by a lodging establishment. A guest of the lodging establishment typically places the magnetically-encoded key card in proximity to a key card reading device coupled to a door to unlock the door. Magnetic stripes store data by modifying the magnetism of tiny iron-based magnetic particles on a band of magnetic material on the card. The magnetic stripe is read by physical contact and swiping past a magnetic reading head housed within the key card receiving device. In those embodiments where a mobile computing device is used to transmit a magnetic transmission signal that simulates or represents the magnetic stripe data, the mobile computing device stores a data file on its memory that is convertible into the magnetic signal, and the signal is transmitted to the magnetic reader head of the receiving device.

Initially, a mobile computing device transmits a token request to the hospitality server. The token request may be sent during, for example, a reservation process, a check-in process, or coming within a predefined distance of the establishment. In response, the server determines whether the mobile computing device is associated with a guest or prospective guest. If the user of the mobile computing device has reserved a room, the server transmits token data to the mobile computing device and matching security data to the key card reading device associated with the room. The server is configured to maintain a record of the token data assigned to the mobile computing device. In at least some embodiments, the mobile computing device converts the token data into a first data file by the computing device processor. The first data file is stored within the memory device of the mobile computing device. In the example embodiment, the first data file is a binary data file of the token data. The mobile computing device includes computer-readable instructions stored within the memory device that, upon execution by the processor, converts the token data into the binary data file. The mobile computing device is configured to further process the first data file and generate a transmission signal that represents the access data. In some embodiments, the transmission signal is generated as an audio signal that uses amplitude and/or frequency changes to represent the access data.

An unlock door function for the reserved room is available within the mobile computing device, such as through a digital wallet. Additional information about the lodging establishment, such as a floor map, lobby information, pool hours, etc., may be received from the server and provided within the digital wallet. To unlock the door, the user presses the unlock door function within the digital wallet and holds the mobile computing device in proximity to the key card reading device. In an alternative embodiment, the cardholder can simply hold the mobile computing device in proximity to the key card reading device without needing to press an unlock door function.

A transmitter may be coupled to the mobile computing device through an audio jack or another interface such as a USB connector. Alternatively, the transmitter may be integrated within the mobile computing device. In the example embodiment, the transmitter contains an electromagnet that is configured to receive the transmission signal generated by the mobile computing device, and output the transmission signal in the form of a changing magnetic field that is receivable by a magnetic reader head included within the key card reading device. The magnetic reader head is able to receive the transmission signal from the mobile computing device. In other embodiments, the mobile computing device and/or transmitter transmit the transmission signal using a different wireless communication method. In such embodiments, the key card reading device includes a receiver configured to receive the transmission signal.

The key card reading device processes the received transmission signal and converts it into a second data file that represents the token data. The key card reading device is further configured to authenticate the received token data. In particular, the key card reading device compares the token data from the transmission signal to the security data stored by the key card reading device. If the token data matches the security data, then the user of the mobile computing device is authenticated. If authentication of the token data is successful, the key card reading device is configured to unlock the door. A notification may be sent to the server and/or the mobile computing device to indicate a successful or unsuccessful authentication.

Thus, the mobile computing device is configured to provide a transmission signal representative of access data to the key card reading device without requiring the user to provide the key card to the reading device. The transmitter coupled to the mobile computing device is configured to, wirelessly and without contacting the key card reading device, transmit the transmission signal representing the access data to a receiver of the key card reading device. The key card reading device converts the transmission signal into a second data file representing the token data, and then authenticates the received token data.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction. In addition, consumer card account behavior can include but is not limited to purchases, management activities (e.g. balance checking), bill payments, achievement of targets (meeting account balance goals, paying bills on time), and/or product registrations (e.g. mobile application downloads).

The methods and systems described herein may be implemented using computer programming or engineering techniques including computer software, firmware, hardware or any combination or subset thereof, wherein the technical effects may be achieved by performing one of the following steps: (a) receiving, by a mobile computing device, token data representing access data of a key card; (b) generating a transmission signal based on the token data, the transmission signal representing the access data; (c) outputting, by the mobile computing device, the transmission signal to the key card reading device when the mobile computing device is placed near the key card reading device; (d) receiving, by a key card reading device, the transmission signal; (e) analyzing the transmission signal to determine if the transmission signal is authenticated; and (f) activating, by the key card reading device, an activation mechanism to cause a selectively accessible device such as a door to be accessible when the transmission signal is authenticated.

The technical benefits achieved by the methods and systems described herein include: (a) reducing the number of lost and/or stolen key cards for accessing rooms at lodging establishments; (b) increasing a speed and an efficiency of processing room key cards at lodging establishments so that guests can quickly access their rooms; and (c) providing increased integration of digital wallets with systems using key card-accessible devices and/or areas.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The system is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a simplified block diagram of an exemplary hospitality computing system 100 including a plurality of computer devices in accordance with one embodiment of the present invention. In the example embodiment, system 100 may be used for contactless transmission of signals representing token data from a mobile computing device 104 to a key card reading device 106 attached to a selectively accessible device. Key card reading device 106 converts the transmission signals to the token data and authenticates the token data. As used herein, token data refers to a unique identifier that is used to assign unlocking permissions to guests. This token data may have a fixed relationship with reading device 106 (i.e., the token data remains the same irrespective of the guests, similar to a physical key), or the token data may be reassignable (i.e., similar to a key card). If authentication is successful, key card reading device 106 unlocks the door. The token data is representative of access data from a key card, such as magnetic stripe data. Access data may include other forms of wireless communication using a key device.

More specifically, system 100 includes a server system 102, mobile computing device 104 connected to server system 102, and at least one key card reading device 106. In the example embodiment, server system 102 is a hospitality server system associated with a lodging establishment. In one embodiment, mobile computing device 104 is a computer including a web browser, such that server system 102 is accessible to mobile computing device 104 using the Internet. Mobile computing device 104 is interconnected to the Internet through many interfaces including a network, such as a local area network (LAN) or a wide area network (WAN), dial-in-connections, cable modems, and special high-speed Integrated Services Digital Network (ISDN) lines. Mobile computing device 104 could be any device capable of interconnecting to the Internet including a web-based phone, PDA, or other web-based connectable equipment.

In the exemplary embodiment, mobile computing device 104 includes a processor, a memory device, and a transmitter for transmitting token data to key card reading device 106. For example, mobile computing device 104 may include mobile phones, smartphones, personal digital assistants (PDAs), iPhone® (iPhone is a registered trademark of Apple, Incorporated located in Cupertino, Calif.), Android® (Android is a registered trademark of Google Incorporated, located in Mountain View, Calif.), and/or any device capable of executing stored computer-readable instructions. Mobile computing device 104 is also wirelessly connected to server 102.

In the example embodiment, key card reading device 106 is connected to server system 102 to receive security data assigned to reading device 106. This security data is stored by reading device 106 for an authentication process described below. Alternatively, key card reading device 106 may be connected to a different database. In some embodiments, key card reading device 106 is interconnected to the Internet through many interfaces including a network, such as a local area network (LAN) or a wide area network (WAN), dial-in-connections, cable modems, wireless modems, and special high-speed ISDN lines. Key card reading device 106 may include an input device capable of reading information from a key card.

A database server 108 is connected to database 110, which contains information on a variety of matters, including token data and security data for one or more key card reading devices 106. In one embodiment, centralized database 110 is stored on server system 102 and can be accessed by potential users of mobile computing device 104 by logging onto server system 102 through mobile computing device 104. In an alternative embodiment, database 110 is stored remotely from server system 102 and may be non-centralized.

Database 110 may include a single database having separated sections or partitions or may include multiple databases, each being separate from each other. Database 110 may store token data and security data relating to lodging establishments (i.e., merchants). Database 110 may also store account data for a cardholder, including at least one of a cardholder name, a cardholder address, an account number, and other account identifier. Database 110 may also store merchant data including a merchant identifier that identifies each merchant registered to use hospitality computing system 100, and instructions for settling transactions including merchant bank account information.

In one embodiment, server system 102 receives token data from participating merchant computing device 112. For example, after a room is reserved at a lodging establishment, server system 102 receives token data associated with the reserved room from merchant computing device 112 for mobile computing device 104. Server system 102 then transmits the token data to mobile computing device 104. Merchant computing device 112 may further transmit security data for corresponding key card reading device 106. Alternatively, merchant computing device 112 may transmit the token data and/or the security data directly to mobile computing device 104 or reading device 106, respectively.

In another embodiment, server system 102 is configured to generate token data and/or security data. The token and security data may be randomly generated. Server system 102 may be configured to maintain records for each room and mobile computing device 104 that is associated with token data and/or security data.

In additional embodiments, server system 102 may also be in communication with an interchange network and/or a payment processor for processing financial transactions submitted by mobile computing device 104. The financial transactions use a financial transaction card and/or a digital wallet, as described above. In one embodiment, a cardholder reserves a room with a lodging establishment by transmitting payment for the room through server system 102. In such an embodiment, server 102 may process the payment using the interchange network and/or the payment processor. Server system 102 may request token data for the reserved room from merchant computing device 112 once server system 102 receives notification that the transaction is approved. Server system 102 then transmits the token data to mobile computing device 104.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

In one embodiment, a digital wallet of mobile computing device 104 is connected via an API to server system 102 to conduct transactions and to authenticate the user of mobile computing device 104. Server system 102 may be configured to wirelessly transmit the token data to the digital wallet. In another embodiment, the cardholder uses a separate computing device, such as a kiosk located at the lodging establishment, to obtain the token data. The token data is stored in the digital wallet for the reserved room. In addition, a room number for the reserved room is provided to the user.

In some embodiments, before receiving the token data, biometric authentication (i.e., a fingerprint, an iris scan, etc.) from the user of mobile computing device 104 may be requested. Once biometric authentication data has been collected and authenticated, mobile computing device 104 notifies server 102 that biometric authentication was successful. Server 102 then transmits the token data to the digital wallet. If biometric authentication is unsuccessful, the token data is not transmitted.

Figure 2:
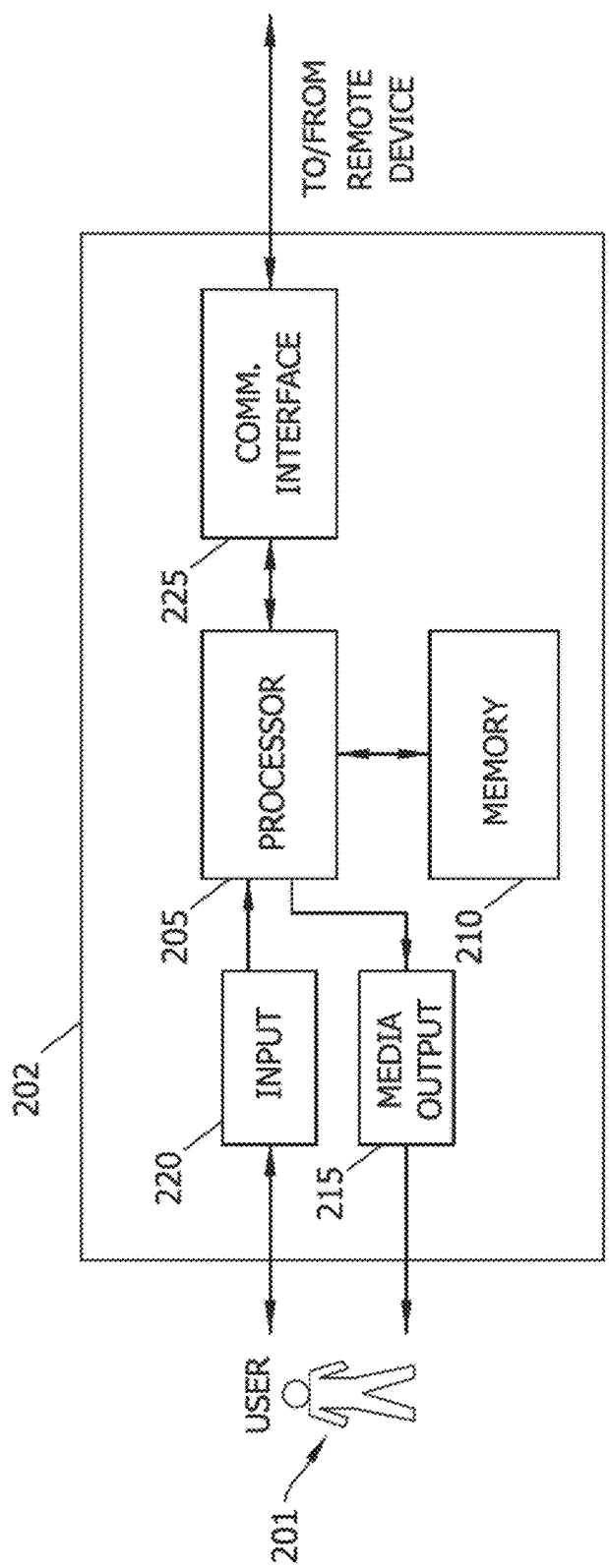

FIG. 2 illustrates an exemplary configuration of a user system 202 operated by a user 201. User system 202 may include, but is not limited to, mobile computing device 104 (shown in FIG. 1). In the exemplary embodiment, user system 202 includes a processor 205 for executing instructions. In some embodiments, executable instructions are stored in a memory area.

Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 102. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 102. A client application allows user 201 to interact with a server application from server system 102.

Figure 3:
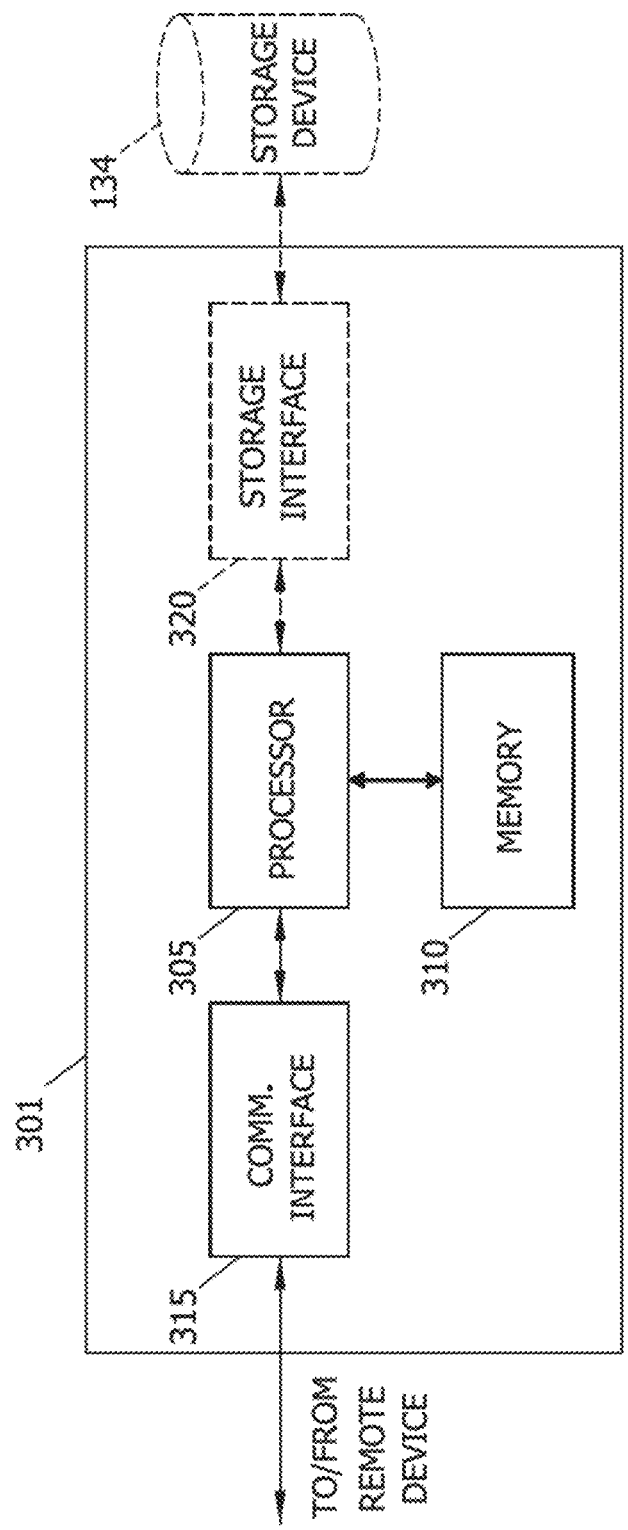

FIG. 3 illustrates an exemplary configuration of a server system 301, such as server system 102 (shown in FIG. 1). Server system 301 may include, but is not limited to, a database server, an application server, and/or a web server.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system (i.e., mobile computing device 104) or another server system 301. For example, communication interface 315 may receive requests from mobile computing device 104 via the Internet, as illustrated in FIG. 1.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
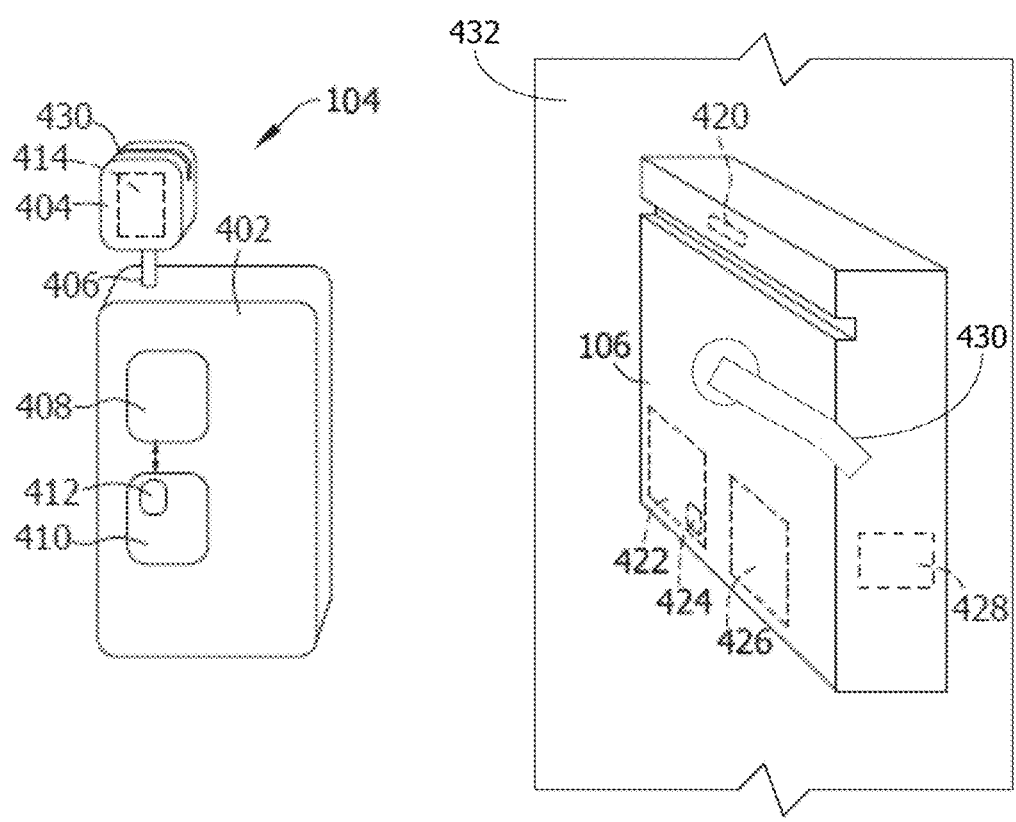

FIG. 4 illustrates an exemplary configuration of the mobile computing device 104 and the key card reading device 106 as shown in FIG. 1 in accordance with an exemplary embodiment of the present invention. Key card reading device 106 is installed on a door 432 to provide selective access. Mobile computing device 104 is coupled to a transmitter 404 through an audio jack 406. In another embodiment, mobile computing device 104 may coupled to transmitter 404 through a proprietary interface such as a USB connector or an iPhone® dock connector. Alternatively, transmitter 404 may be integrally formed with mobile computing device 104 or coupled to mobile computing device 104 using a different technique.

Mobile computing device 104 includes a processor 408 and a memory device 410 for storing token data 412. Mobile computing device 104 may include, for example, mobile phones, smartphones, personal digital assistants (PDAs), and/or any device capable of executing stored computer-readable instructions. Processor 408 executes instructions that are stored on memory device 410. Memory device 410 may include one or more computer readable media. In the example embodiment, transmitter 404 includes an electromagnet 414 for generating a magnetic field. Transmitter 404 controls electromagnet 414 to generate a changing magnetic field for connecting with key card reading device 106. In another embodiment, transmitter 404 includes an amplifier for transmitting an audio signal to key card reading device 106. In the case where the transmitter 404 has an amplifier, key card reading device 106 would include a microphone for receiving the audio wave. In other embodiments, mobile computing device 104 is configured to generate near field communication (NFC) signals, radio signals, or other types of wireless communication to transmit data.

Processor 408 is configured to receive token data 412 representative of access data for a key card. Token data 412 is stored in memory device 410. In the exemplary embodiment, token data 412 is a binary coded decimal (BCD) data file. In some embodiments, when the user wants to access door 432, processor 408 executes instructions stored on memory device 410 to convert token data 412 into a transmission signal in response to the user selecting an "unlock door" option on mobile computing device 104. In other embodiments, token data 412 is already converted into the transmission signal prior to the user selecting the "unlock door" option. The transmission signal is representative of the access data that provides selective access to door 432. The transmission signal may include, but is not limited to, changing magnetic fields, an NFC signal, an audio signal, and/or other wireless communication signals. The changing magnetic fields include polarity data that represents the magnetic stripe data. The NFC signal includes the token data as a payload formatted for the NFC protocol. The audio signal uses amplitude and/or frequency shifts to encode the token data. Processor 408 then transmits the transmission signal to transmitter 404 to be sent to key card reading device 106. In some embodiments, transmitter 404 may convert, adjust, or otherwise manipulate the transmission signal before transmitting to reading device 106. For example, if the transmission signal is an audio signal, electromagnet 414 converts the audio signal into changing magnetic fields and outputs the changing magnetic fields.

There are several ways for access data to be entered into mobile computing device 104. In one embodiment, the access data is provided to mobile computing device 104 by a key card. In one example, a magnetic stripe reader 430 is integrated into the housing of transmitter 404. A user swipes the key card and processor 408 converts the magnetic stripe data (i.e., the access data) into token data 412. Processor 408 then stores token data 412 in memory device 410 and converts it into a transmission signal for transmission. In another embodiment, a server (i.e., server 102) transmits token data 412 to mobile computing device 104. Token data 412 may be sent to mobile computing device 104 by means including, but not limited to email, text message, the Internet, a software application, or a removable storage device. In another embodiment, the user manually inputs token data 412 into mobile computing device 104 using means including, but not limited to a touch screen, touch pad, keyboard, or mouse. In the example embodiment, token data 412 is transmitted to mobile computing device 104 during a reservation or check-in process. That is, when a user attempts to reserve a room or check-in for a previously reserved room, token data 412 associated with the reserved room is transferred to mobile computing device 104 to enable the user to unlock a door to the reserved room and access the room.

Key card reading device 106 includes a receiver 420, a processor 422 for processing a second data file 424, and a transceiver 426. In at least some embodiments, receiver 420 is a magnetic reader head configured to detect magnetic data. Additionally or alternatively, receiver 420 may be an NFC receiver or a different type of receiver suitable to receive the transmission signal. When transmitter 404 is placed within close proximity (e.g., 0.1-30 centimeters) to receiver 420 of key card reading device 106, the transmission signal is collected by the data recovery circuit of receiver 420. If the transmission signal includes changing magnetic fields, the current created by electromagnet 414 generates a strobe pattern, which activates receiver 420 to receive incoming data. Receiver 420 receives the transmission signal representative of the access data as though a key card was actually swiped in key card reading device 106.

Key card reading device processor 422 then receives and processes the transmission signal. Key card reading device processor 422 converts the transmission signal into second data file 424, which represents the token data. Key card reading device processor 422 then authenticates the transmission signal and the user of mobile computing device 104. More specifically, processor 422 is configured to compare second data file 424 to stored security data (not shown in FIG. 4) provided by server 102. If second data file 424 and the stored security data substantially match, the user is authenticated. Processor 422 generates an authentication message that is transmitted by transceiver 426 to mobile computing device 104 and/or server system 102.

Processor 422 may further unlock door 432 coupled to reading device 106 using an activation mechanism 428. Activation mechanism 428 may be configured to, for example, actuate a movable bolt from an engaged position with the door to a disengaged position. In other embodiments, activation mechanism 428 may be configured to activate other selectively accessible devices, such as an elevator controller or a gate controller. Activating activation mechanism 428 causes the selectively accessible device coupled to or in communication with reading device 106 to be accessible. Alternatively, deactivating activation mechanism 428 may have the same effect. In the example embodiment, key card reading device includes an integrated handle 430 for opening or accessing door 432. Once a bolt or other locking mechanism (not shown) is disengaged by activation mechanism 428, a user may actuate handle 430 to open door 432. In other embodiments, different mechanisms may be used to open door 432.

Figure 5:
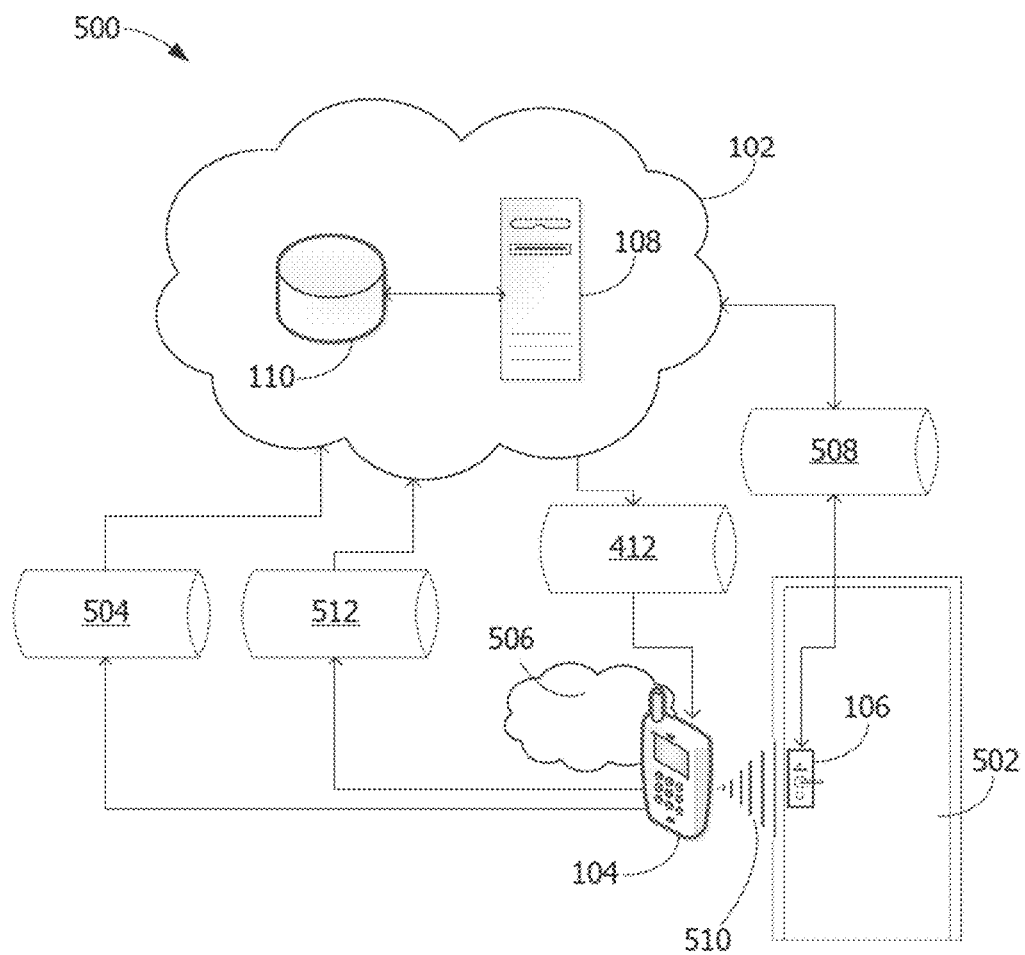

FIG. 5 is a schematic view of one embodiment for providing access to a room using hospitality computing system 500. System 500 is similar to system 100 (shown in FIG. 1) and, in the absence of contrary representation, includes similar subsystems and reference numbers. In the example embodiment, system 500 includes server system 102, mobile computing device 104, key card reading device 106, and a door 502. Door 502 is associated with a selectively accessible room (e.g., a hotel room). Reading device 106 is configured to prevent door 502 from opening until a user has been authenticated.

In the example embodiment, mobile computing device 104 is configured to transmit a token request 504 to server system 102. Token request 504 may be transmitted during a reservation or check-in process. Token request 504 may include, for example, a reservation request, a check-in confirmation, or another type of request to indicate that the user is at the lodging establishment associated with server system 102 and door 502 and, in at least some embodiments, has reserved a room. In one embodiment, the user may send token request 504 via an app, web interface, and/or API associated with server system 102. In some embodiments, token request 504 may be transmitted through a wallet app 506 installed on mobile computing device 104. Wallet app 506 is configured to store payment information for the user to facilitate card not present (CNP) transactions with mobile computing device 104. In certain embodiments, token request 504 is received by server 102 from different computing device, such as a kiosk or terminal configured to guide the user or guest through the reservation or check-in process.

Server system 102 is configured to receive token request 504 and identify token data 412 associated with the reserved room to provide to mobile computing device based on token request 504. More specifically, database server 108 retrieves token data 412 from database 110 or generates token data 412. In the example embodiment, token data 412 is provided to mobile computing device 104 and key card reading device 106 is provided matching security data 508 to prevent previous occupants of the room from having access to the room through door 502. Token data 412 and security data 508 may be replaced on a recurring schedule by server system 102. For example, server system 102 may replace token data 412 and security data 508 every 24 hours (e.g., at the end of a check-out time frame).

Server system 102 is configured to store a record of token data 412 and security data 508 for each mobile computing device 104, key card reading device 106, and/or room. Server system 102 may maintain a historical list of records in database 110 for analysis and security against access from prior occupants attempting to access rooms.

In some embodiments, server system 102 may be further configured to request payment information for the room through wallet app 506. Mobile computing device 104 may automatically provide payment information stored in wallet app 506 in response to token data 412 or during token request 504. Alternatively, payment information may be provided by the user previously when reserving the room.

Once mobile computing device 104 has received and stored token data 412 and card reading device 106 has received and stored security data 508, the user approaches door 502 to begin an unlock or authentication process to open door 502. In one example, the user select an "unlock door" option provided on mobile computing device 104 to initiate the unlock process. In particular, mobile computing device 104 generates a transmission signal 510 that represents access data associated with a key card based on token data 412. In at least some embodiments, transmission signal 510 includes token data 412. Transmission signal 510 may include, but is not limited to, changing magnetic fields, an NFC signal, an audio signal, or another type of signal for encoding magnetic stripe data. Although the aforementioned signals are generally transmitted within a close proximity, it is to be understood that other communication forms and protocols may be used to transmit the access data. Transmission signal 510 may also be encrypted.

Once generated, transmission signal 510 may be converted before being transmitted to reading device 106. For example, if transmission signal 510 is initially generated as an audio signal, then transmission signal 510 may be provided to a transmitter (shown in FIG. 4) that is configured to convert the audio signal into changing magnetic fields. Transmission signal 510 is transferred via contactless communication to key card reading device 106 by mobile computing device 104 for authentication. In one embodiment, transmission signal 510 is output to reading device 106 only when mobile computing device 104 is within a predefined distance or range of reading device 106.

Reading device 106 is configured to receive transmission signal 510 and convert, analyze, or otherwise manipulate transmission signal 510 to identify the data representative of the access data. In some embodiments, the data may be token data 412. In such embodiments, reading device 106 compares the token data from transmission signal 510 to the received security data 508 from server system 102. If token data 412 and security data 508 substantially match, then the user is authenticated. In alternate embodiments, token data 412 and security data 510 may be complimentary. That is, when analyzed in combination, token data 412 and security data 510 create a result that indicates the user is the authentic user of the room. For example, token data 412 and security data 508 may be an encrypted message and a decryption key that, when combined, decrypt the encrypted message. If the user has been authenticated, reading device 106 disengages door 502 from the door frame and enables the user to open door 502. In some embodiments, reading device 106 is configured to transmit an authentication message to server system 102 and/or mobile computing device 104 that indicates whether or not the authentication was successful and if door 502 has been unlocked. Server system 102 may store these authentication messages within the record. The user may repeat this process for each time door 502 is locked.

Additionally, once the user is ready to check-out, the user may send a check-out message 512 to server 102 through mobile computing device 104 or another device (e.g., a kiosk). Server system 102 may provide mobile computing device 104 with a bill for the room that the user can pay using wallet app 506. In addition, system 500 may be configured to delete token data 412 stored by mobile computing device 104 and/or security data 508 from reading device 106 to prevent the user from accessing the room without permission.

Figure 6:
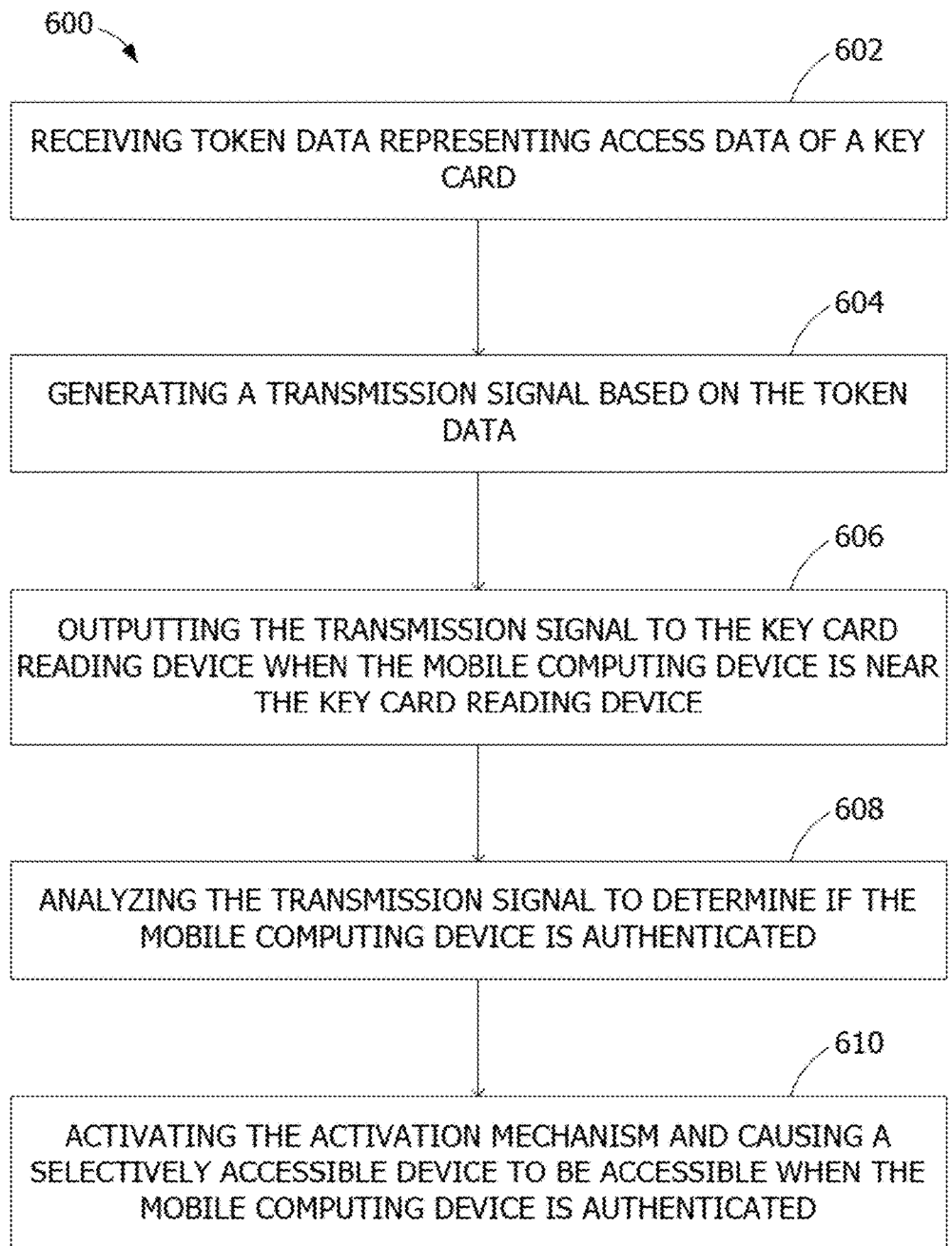

FIG. 6 is a flow diagram of a method 600 for transmitting token data to a key card reading device attached to a door. In the example embodiment, method 600 is at least partially performed by a mobile computing device (e.g., mobile computing device 104, shown in FIG. 1) and a key card reading device (e.g., reading device 106, shown in FIG. 1). In other embodiments, method 600 may include additional, fewer, or alternative steps. Method 600 may also be performed by different devices.

Method 600 begins with the mobile computing device transmitting a token request to a hospitality server associated with a lodging establishment. The mobile computing device receives 602 token data representing access data of a key card from the hospitality server. The key card reading device for the reserved room receives security data that matches the received token data from the hospitality server. Once the token data is stored and the user of the mobile computing device wants to unlock the door coupled to the reading device, the mobile computing device generates 604 a transmission signal based on the token data. The transmission signal represents the access data of the key card. The transmission signal may be, for example, changes in a magnetic field, an NFC signal, an audio signal, and/or a different signal for wireless communication. In some embodiments, the mobile computing device generates an audio signal that represents changing polarities and sends the audio signal to a transmitter coupled to the mobile computing device. The transmitter includes an electromagnet that generates converts the transmission signal from an audio signal to changes in a magnetic field.

The mobile computing device outputs 606 the transmission signal remotely (i.e., contactless) to the key card reading device. In particular, to output 606 the transmission signal, the user may approach the key card reading device and place the mobile computing device near the key card reading device to facilitate short-range wireless transmission. Once received, the reading device determines 608 whether or not the user is authenticated based on the transmission signal. More specifically, the reading device converts the transmission signal back into token data and compares the converted token data to the stored security data from the server system. If the token data and the security data substantially match, the user is authenticated. In some embodiments, the reading device may transmit an authentication result or notification to the server system and/or the mobile computing device. When the user is authenticated, the reading device activates 610 an activation mechanism to cause a selectively accessible device (i.e., the door) to be accessible. More specifically, the activation mechanism causes the door to unlock and enable the user to access the room. A portion of method 600 may be repeated each time the user attempts to access the door when the door is locked.

In some embodiments, when the user is ready to leave, the hospitality server may receive a check-out request from the mobile computing device or a different computing device. In response, the hospitality server may generate a bill for the room and transmit the bill to the mobile computing device for review and payment. In some embodiments, the hospitality server also deletes the token data from the mobile computing device and/or the security data from the key card reading device to prevent unauthorized access to the room.

The above-described embodiments of methods and systems for contactless transmission of token data by a mobile computing device to a key card reading device. As a result, the methods and systems described herein facilitate contactless transmission of token data to pre-existing key card reading devices.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is receiving token data, converting the data into a first data file by a processor, converting the first data file to a first waveform by the processor, converting the first waveform into a second waveform for transmission by a transmitter, receiving the second waveform by a key card reading device, converting the second waveform into a second data file, and authenticating the token data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mobile computing device for transmitting token data to a key card reading device configured to selectively unlock a door and having an activation mechanism, said mobile computing device comprising:
    a memory device for storing data;
    a processor; and
    a transmitter comprising an electromagnet, said processor in communication with said memory device and said transmitter, said mobile computing device programmed to:
    receive inputted biometric data from a user of said mobile computing device, the inputted biometric data for authenticating the user as a legitimate user of said mobile computing device;
    transmit an authentication indicator to a hospitality server indicating that the user has been authenticated as the legitimate user of said mobile computing device;
    receive, from the hospitality server, in response to transmitting the authentication indicator, token data representing access data of a key card for unlocking the door; and
    output a transmission signal based in part on the token data to the key card reading device, wherein the transmission signal is configured to cause the key card reading device to activate the activation mechanism when the mobile computing device is placed near the key card reading device and the transmission signal is authenticated by the key card reading device.

2. The mobile computing device in accordance with claim 1, wherein said mobile computing device is further programmed to:
    prompt the user to select an unlock function displayed on said mobile computing device; and
    transmit the transmission signal after the unlock function is selected such that the activation mechanism is activated and the door is unlocked.

3. The mobile computing device in accordance with claim 1, wherein said mobile computing device is connected to the hospitality server via an API to verify the user of said mobile computing device as a registered occupant.

4. The mobile computing device in accordance with claim 1, wherein the token data is not transmitted by the hospitality server to said mobile computing device when the inputted biometric data is not authenticated.

5. The mobile computing device in accordance with claim 1, wherein the token data is transmitted from a kiosk computing device associated with the key card reading device.

6. The mobile computing device in accordance with claim 1, wherein the token data is stored within said mobile computing device.

7. The mobile computing device in accordance with claim 1, wherein the key card reading device further authenticates said mobile computing device and the transmission signal by comparing a data file to security data stored within a database and provided by the hospitality server, wherein the data file represents the token data.

8. A method for activating an activation mechanism of a key card reading device configured to selectively unlock a door, said method comprising:
    receiving, inputted biometric data from a user of a mobile computing device, the inputted biometric data for authenticating the user as a legitimate user of the mobile computing device;
    transmitting, by the mobile computing device, an authentication indicator to a hospitality server indicating that the user has been authenticated as the legitimate user of the mobile computing device;
    receiving, by the mobile computing device, from the hospitality server, in response to transmitting the authentication indicator, token data representing access data of a key card for unlocking the door; and
    outputting, by the mobile computing device, a transmission signal based in part on the token data to the key card reading device, wherein the transmission signal is configured to cause the key card reading device to activate the activation mechanism when the mobile computing device is placed near the key card reading device and the transmission signal is authenticated by the key card reading device.

9. The method in accordance with claim 8 further comprising:
    prompting the user to select an unlock function displayed on the mobile computing device; and
    transmitting, by the mobile computing device, the transmission signal after the unlock function is selected such that the activation mechanism is activated and the door is unlocked.

10. The method in accordance with claim 8, wherein the mobile computing device is connected to the hospitality server via an API to verify the user of the mobile computing device as a registered occupant.

11. The method in accordance with claim 8, wherein the token data is not transmitted by the hospitality server to the mobile computing device when the inputted biometric data is not authenticated.

12. The method in accordance with claim 8, wherein the token data is transmitted from a kiosk computing device associated with the key card reading device.

13. The method in accordance with claim 8, wherein the token data is stored within the mobile computing device.

14. The method in accordance with claim 8, wherein the key card reading device further authenticates the mobile computing device and the transmission signal by comparing a data file to security data stored within a database and provided by the hospitality server, wherein the data file represents the token data.

15. At least one non-transitory computer-readable storage medium having computer-executable instructions embodied thereon, wherein when executed by at least one processor included within a mobile computing device, the computer-executable instructions cause the processor to:
    receive inputted biometric data from a user of the mobile computing device, the inputted biometric data for authenticating the user as a legitimate user of the mobile computing device;

transmit an authentication indicator to a hospitality server indicating that the user has been authenticated as the legitimate user of the mobile computing device;

receive, from the hospitality server, in response to transmitting the authentication indicator, token data representing access data of a key card for unlocking a door; and output a transmission signal based in part on the token data to a key card reading device, wherein the transmission signal is configured to cause the key card reading device to activate an activation mechanism when the mobile computing device is placed near the key card reading device and the transmission signal is authenticated by the key card reading device.

16. The computer-readable storage medium in accordance with claim 15 further cause the processor to:

prompt the user to select an unlock function displayed on the mobile computing device; and transmit the transmission signal after the unlock function is selected such that the activation mechanism is activated and the door is unlocked.

17. The computer-readable storage medium in accordance with claim 15, wherein the transmission signal is further configured to cause the activation mechanism to unlock the door when the mobile computing device is placed near the key card reading device, prompts an unlock function, and the unlock function is selected by the user.

18. The computer-readable storage medium in accordance with claim 15, wherein the mobile computing device is connected to the hospitality server via an API to verify the user of the mobile computing device as a registered occupant.

19. The computer-readable storage medium in accordance with claim 15, wherein the token data is not transmitted by the hospitality server to the mobile computing device when the inputted biometric data is not authenticated.

20. The computer-readable storage medium in accordance with claim 15, wherein the token data is transmitted from a kiosk computing device associated with the key card reading device.

21. The computer-readable storage medium in accordance with claim 15, wherein the token data is stored within the mobile computing device.

22. The computer-readable storage medium in accordance with claim 15, wherein the key card reading device further authenticates the mobile computing device and the transmission signal by comparing a data file to security data stored within a database and provided by the hospitality server, wherein the data file represents the token data.

* * * * *